C. J. MYERS.
ELECTRIC CURRENT CHANGING MEANS.
APPLICATION FILED APR. 4, 1918.

1,306,923.

Patented June 17, 1919.

WITNESS.
Walter H. Troemel.

INVENTOR
Clyde J. Myers
BY
Bradford & Doolittle
ATTORNEYS

UNITED STATES PATENT OFFICE.

CLYDE J. MYERS, OF INDIANAPOLIS, INDIANA, ASSIGNOR TO SWARTZ ELECTRIC COMPANY, OF INDIANAPOLIS, INDIANA, A CORPORATION OF INDIANA.

ELECTRIC-CURRENT-CHANGING MEANS.

1,306,923.

Specification of Letters Patent.

Patented June 17, 1919.

Application filed April 4, 1918. Serial No. 226,643.

*To all whom it may concern:*

Be it known that I, CLYDE J. MYERS, a citizen of the United States, residing at Indianapolis, Marion county, and State of Indiana, have invented and discovered certain new and useful Improvements in Electric-Current-Changing Means, of which the following is a specification.

My invention relates to the current changing means and the object thereof is to provide means whereby an alternating current of practically constant voltage may be taken from a source of direct current or a direct current may be taken from an alternating current, and whereby in such conversion the use of a mercury rectifier and rotary converter may be dispensed with, and also the generator section of a generator set is rendered unnecessary.

Figure 1:
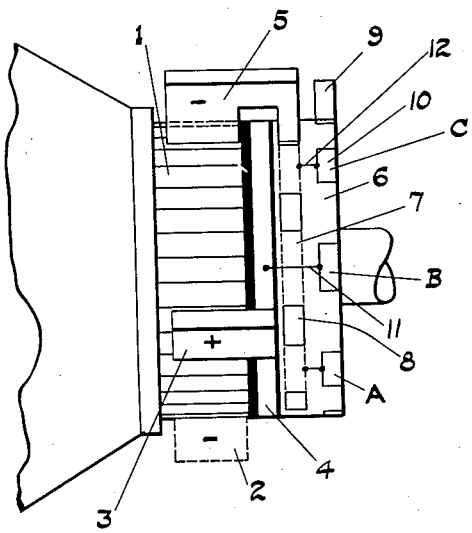
Figure 2:
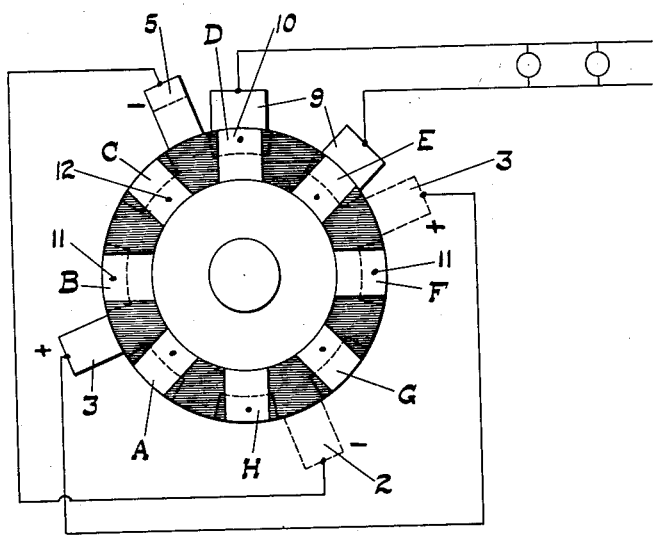

An embodiment of the invention is illustrated in the accompanying drawings. In these drawings, Figure 1 is a side view in elevation showing the invention applied to the commutator of a direct current dynamo, and Fig. 2, a sectional view at right angles to Fig. 1.

Referring to the drawings, 1 indicates the commutator, 2 a negative terminal brush bearing on the commutator segments only, 3 a positive direct current terminal brushes bearing on the commutator segments and also having contact with the surface of a ring 4 otherwise insulated from the commutator and revoluble therewith. 5 indicates a negative direct current commutator terminal brush having bearing on the commutator segments and also adapted to span a carrier 6 so as to have contact with a broken ring 7 having a series of projecting segments 8 which are insulated from one another at their surfaces by the body of said carrier. Collector terminal brushes 9 bear against the surface of the carrier, in contact with a series of separate segments 10, the segments being insulated from one another by the body of the carrier. Of these outside segments, those marked A, C, E and G are negative and those marked B, D, F and H are positive, for example. The inner segment ring is always negative in this example, and the solid ring 4 is positive. Four positive segments of the outer segments are connected by connectors 11 with the innermost ring 4 while each alternate segment of said outer segments is connected to the middle ring by means of connectors 12.

It will be seen that in this arrangement, the positive brushes ride, in addition to the commutator, a revolving ring which is insulated from the commutator thereby charging the latter with positive current. The negative brushes ride an insulated ring which is broken by insulating material allowing the negative brushes or brush to make contact at intervals depending on the cycles required. At these intervals the negative current is furnished to this negative ring which is insulated from the commutator. Four positive outside segments are connected with the positive ring but insulated from everything else and four negative segments are connected to the intermediate ring and insulated from everything else. Assuming that the machine revolves at 900 revolutions per minute, for instance, it will produce a current of 60 cycles, in conjunction with the eight segments connected with the positive ring and negative ring segments respectively. The positive and negative segments alternate and the two brushes 9 connect these segments, the leads going to the circuit through which the alternating current is to be directed. The relative widths or arcs circumferentially of the brush or brushes 3, and brush or brushes 9, or the relative circumferential widths of the segments 10 and segments 8, are such that the brushes 9 will remain in contact with their corresponding segments for an interval after the brushes 3 have broken contact with their segments, so as to produce an overlapping contact which will serve to prevent arcing as the segments pass the brushes.

Having thus described my invention, what I claim is:—

1. In combination with a source of electrical energy, means associated with said source for converting the current comprising revolving current charged elements, having two sets of pole changing members, the members of one set being alternately positive and negative, and a third element connected to the members of one polarity of the latter set and the members of the other polarity being connected to the first set, and contact members having common connection with said source and said third element, and other contact members having common contact with the current source terminals and a set of pole changing elements.

2. In combination with a dynamo, a commutator therefor, a current changing element revolving with the commutator but insulated therefrom, positive brushes riding the commutator and said element, a second insulated revolving element having separated brush contacts, negative brushes riding said commutator and said second element and a series of revolving alternate positive and negative brush contact segments insulated from the other elements, and collecting brushes bearing on said latter segments, the alternate members of said last named elements being connected to the first element and second element respectively.

In witness whereof, I have hereunto set my hand and seal at Indianapolis, this 23rd day of March, A. D. nineteen hundred and eighteen.

CLYDE J. MYERS. [L. S.]

Witnesses:
C. K. BURDICK,
W. B. SEFTON.